(12) United States Patent
Baptist et al.

(10) Patent No.: US 10,176,045 B2
(45) Date of Patent: Jan. 8, 2019

(54) INTERNET BASED SHARED MEMORY IN A DISTRIBUTED COMPUTING SYSTEM

(71) Applicant: International Business Machines Corporation, Armonk, NY (US)

(72) Inventors: Andrew D. Baptist, Mt. Pleasant, WI (US); Greg R. Dhuse, Chicago, IL (US); S. Christopher Gladwin, Chicago, IL (US); Gary W. Grube, Barrington Hills, IL (US); Wesley B. Leggette, Chicago, IL (US); Manish Motwani, Chicago, IL (US); Jason K. Resch, Chicago, IL (US); Thomas F. Shirley, Jr., Wauwatosa, WI (US); Ilya Volvovski, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/437,862

(22) Filed: Feb. 21, 2017

(65) Prior Publication Data
US 2017/0160943 A1    Jun. 8, 2017

Related U.S. Application Data

(63) Continuation-in-part of application No. 13/865,641, filed on Apr. 18, 2013, which is a continuation-in-part
(Continued)

(51) Int. Cl.
*G06F 11/10* (2006.01)
*G06F 3/06* (2006.01)
(Continued)

(52) U.S. Cl.
CPC .......... *G06F 11/1076* (2013.01); *G06F 3/067* (2013.01); *G06F 3/0619* (2013.01);
(Continued)

(58) Field of Classification Search
CPC ..................................................... G06F 3/067
See application file for complete search history.

(56) References Cited

U.S. PATENT DOCUMENTS

| 4,092,732 | A | 5/1978 | Ouchi |
| 5,454,101 | A | 9/1995 | Mackay et al. |
(Continued)

FOREIGN PATENT DOCUMENTS

EP    1903750 A1    3/2008

OTHER PUBLICATIONS

Shamir; How to Share a Secret; Communications of the ACM; vol. 22, No. 11; Nov. 1979; pp. 612-613.
(Continued)

*Primary Examiner* — Simon P Kanaan
(74) *Attorney, Agent, or Firm* — Garlick & Markison; Timothy W. Markison; Patricia A. Markison

(57) ABSTRACT

A method includes receiving, by a computing device of a dispersed storage and task (DST) network, raw data. The method further includes dispersed storage (DS) error encoding the raw data in accordance with initial DS error encoding parameters to produce a plurality of sets of encoded data slices (EDSs). The method further includes determining index generation task information and sending the plurality of sets of EDSs and the index generation task information to a set of DST execution units. The method further includes generating, by the set of DST execution units, partial data indexes from the plurality of sets of EDSs based on the index generation task information. The method further includes generating a data index based on the partial data indexes and an operational task, partitioning the operational task into a set of partial tasks, and sending the set of partial tasks to the set of DST execution units.

14 Claims, 8 Drawing Sheets

Related U.S. Application Data of application No. 13/707,490, filed on Dec. 6, 2012, now Pat. No. 9,304,857.

(60) Provisional application No. 61/569,387, filed on Dec. 12, 2011.

(51) Int. Cl.

| | | |
|---|---|---|
| *H04L 29/08* | (2006.01) | |
| *H04L 29/06* | (2006.01) | |
| *G06F 11/14* | (2006.01) | |
| *G06F 11/20* | (2006.01) | |
| *G06F 21/60* | (2013.01) | |
| *G06F 21/62* | (2013.01) | |
| *H03M 13/37* | (2006.01) | |
| *G06F 9/50* | (2006.01) | |
| *H03M 13/15* | (2006.01) | |
| *H03M 13/09* | (2006.01) | |

(52) U.S. Cl.
CPC ........ *G06F 3/0659* (2013.01); *G06F 9/5066* (2013.01); *G06F 11/1451* (2013.01); *G06F 11/2058* (2013.01); *G06F 11/2069* (2013.01); *G06F 21/602* (2013.01); *G06F 21/6218* (2013.01); *H03M 13/3761* (2013.01); *H04L 67/04* (2013.01); *H04L 67/10* (2013.01); *H04L 67/1017* (2013.01); *H04L 67/1097* (2013.01); *H04L 67/306* (2013.01); *H04L 69/04* (2013.01); *G06F 2211/1028* (2013.01); *H03M 13/09* (2013.01); *H03M 13/1515* (2013.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 9,338,140 B2 | 5/2016 | O'Hare et al. | |
| 2002/0044657 A1 | 4/2002 | Asano et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0163507 A1 | 8/2003 | Chang | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0018853 A1 | 1/2005 | Lain et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0016604 A1* | 1/2007 | Murthy | G06F 17/30911 |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0287200 A1* | 11/2010 | Dhuse | H04N 7/17336 707/770 |
| 2011/0071988 A1 | 3/2011 | Resch | |
| 2011/0307645 A1* | 12/2011 | Hall | G06F 3/0611 711/103 |
| 2012/0331088 A1* | 12/2012 | O'Hare | G06F 21/6227 709/214 |
| 2013/0238900 A1* | 9/2013 | Leggette | H04L 63/0428 713/165 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Vorking Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

(56) References Cited

OTHER PUBLICATIONS

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Communication pursuant to Article 94(3) EPC; EP Application No. 12856963.9; dated May 26, 2017; 9 pages.

International Business Machines; Response to EP communication dated May 26, 2017; Nov. 1, 2017; 5 pgs.

\* cited by examiner

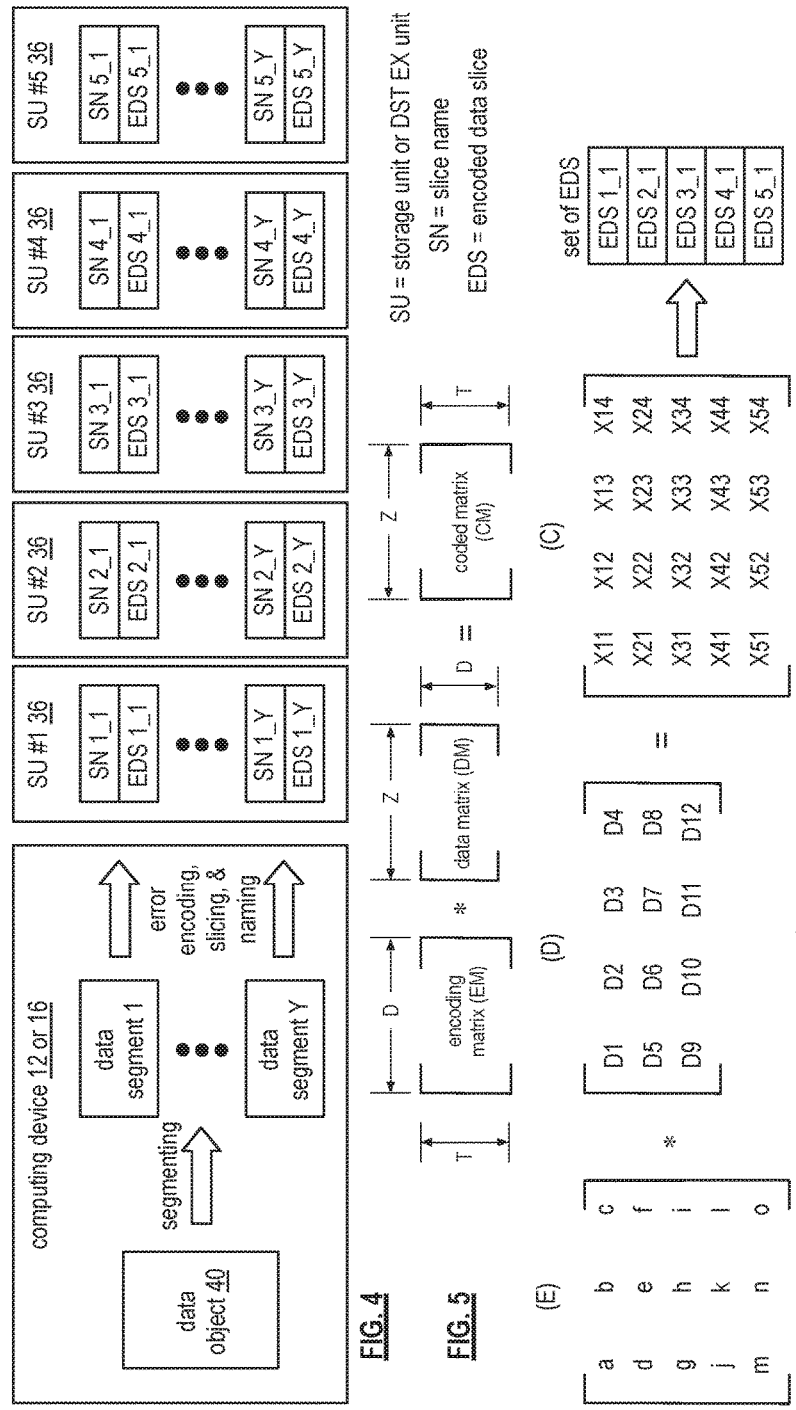

INTERNET BASED SHARED MEMORY IN A DISTRIBUTED COMPUTING SYSTEM

CROSS-REFERENCE TO RELATED APPLICATIONS

The present U.S. Utility Patent Application claims priority pursuant to 35 U.S.C. § 120 as a continuation-in-part of U.S. Utility application Ser. No. 13/865,641, entitled "DISPERSED STORAGE NETWORK SECURE HIERARCHICAL FILE DIRECTORY," filed Apr. 18, 2013, which claims priority pursuant to 35 USC § 120 as a continuation-in-part of U.S. Utility application Ser. No. 13/707,490, entitled "RETRIEVING DATA FROM A DISTRIBUTED STORAGE NETWORK," filed Dec. 6, 2012, issued as U.S. Pat. No. 9,304,857 on Apr. 5, 2016, which claims priority pursuant to 35 U.S.C. § 119(e) to U.S. Provisional Application No. 61/569,387, entitled "DISTRIBUTED STORAGE AND TASK PROCESSING," filed Dec. 12, 2011, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

DESCRIPTION OF RELATED ART

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 4 is a schematic block diagram of an example of dispersed storage error encoding of data in accordance with the present invention;

FIG. 5 is a schematic block diagram of a generic example of an error encoding function in accordance with the present invention;

FIG. 6 is a schematic block diagram of a specific example of an error encoding function in accordance with the present invention;

FIG. 7 is a schematic block diagram of an example of a slice name of an encoded data slice (EDS) in accordance with the present invention;

DETAILED DESCRIPTION OF THE INVENTION

Figure 1:
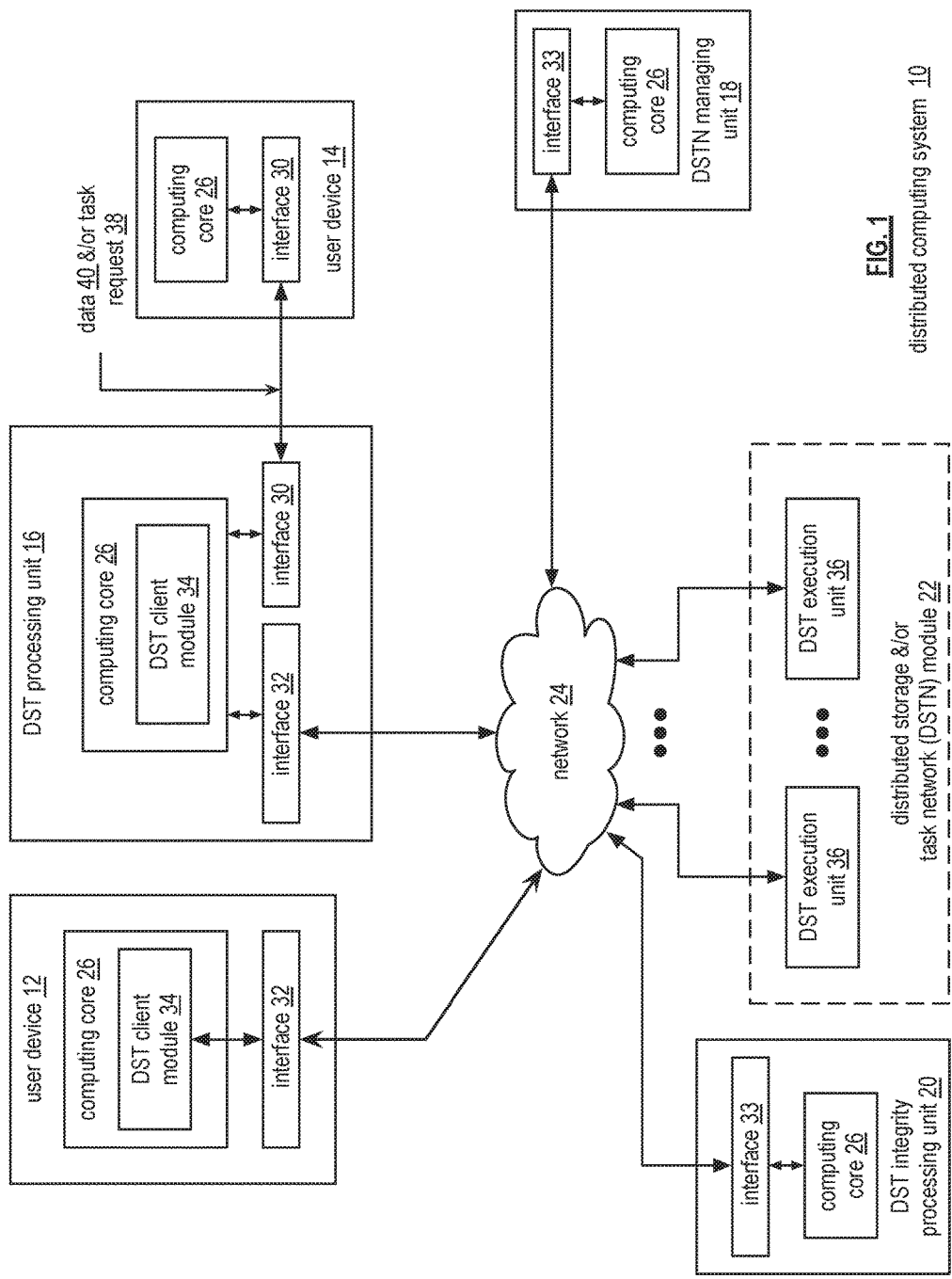
FIG. 1 is a schematic block diagram of an embodiment of a distributed or dispersed computing system in accordance with the present invention.

FIG. 1 is a schematic block diagram of an embodiment of a distributed or dispersed computing system 10 that includes a user device 12 and/or a user device 14 (e.g., computing devices), a distributed storage and/or task (DST) processing unit 16 (e.g., a computing device), a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interfaces 30 support a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general, and with respect to DS error encoded data storage and retrieval, the distributed computing system 10 supports three primary operations: storage management, data storage and retrieval, and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g. or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing module 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units)

from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data. With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations includes, but is not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. With respect to the DST management, it is substantially similar to the DST management to support distributed task processing on received data.

Figure 2:
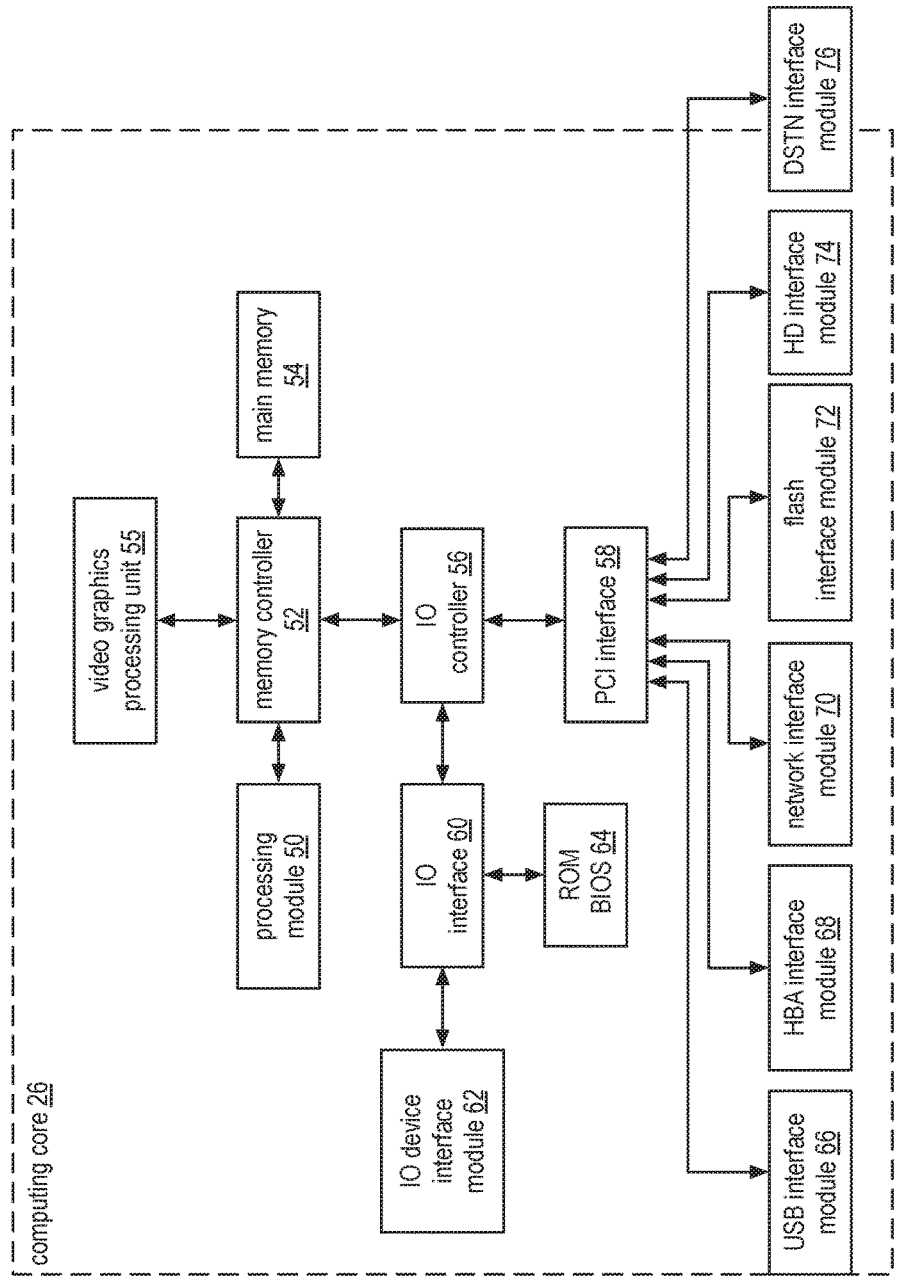
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
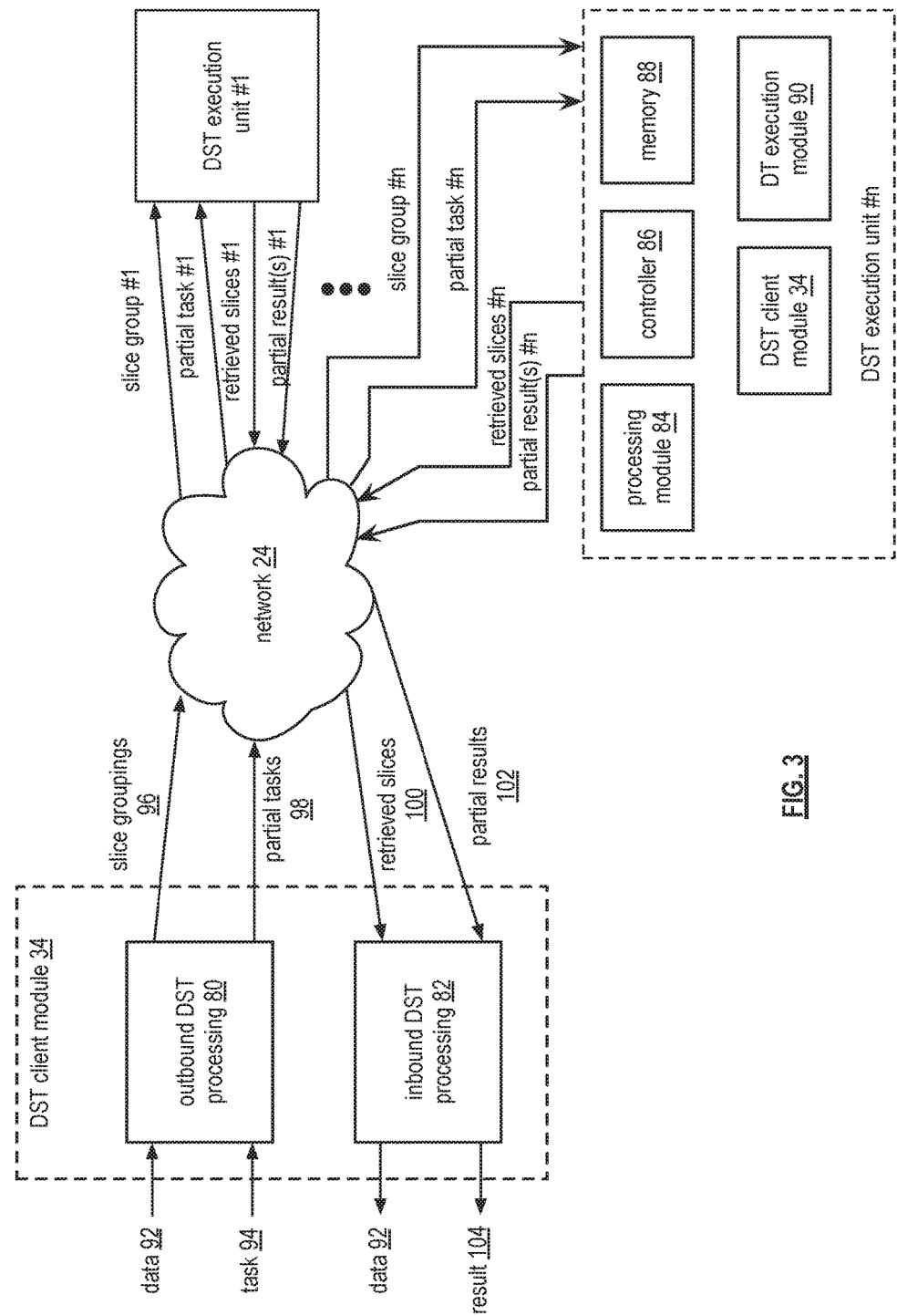
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terra-Bytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

FIG. 4 is a schematic block diagram of an example of dispersed storage error encoding of data. When a computing device (e.g., user device 12 or DST processing unit 16) has data to store and/or tasks to perform on the data, it disperses storage error encodes the data and/or tasks in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 5 and a specific example is shown in FIG. 6); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 5 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 6 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54; corresponds to a fifth encoded data slice (EDS 5_1). Note that the second number of the EDS designation corresponds to the data segment number.

Returning to the discussion of FIG. 4, the computing device also creates a slice name (SN) for each encoded data slice (EDS) in the set of encoded data slices. A typical format for a slice name 106 is shown in FIG. 7. As shown, the slice name (SN) 106 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSTN address for the encoded data slice for storage and retrieval from the DSTN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 8:
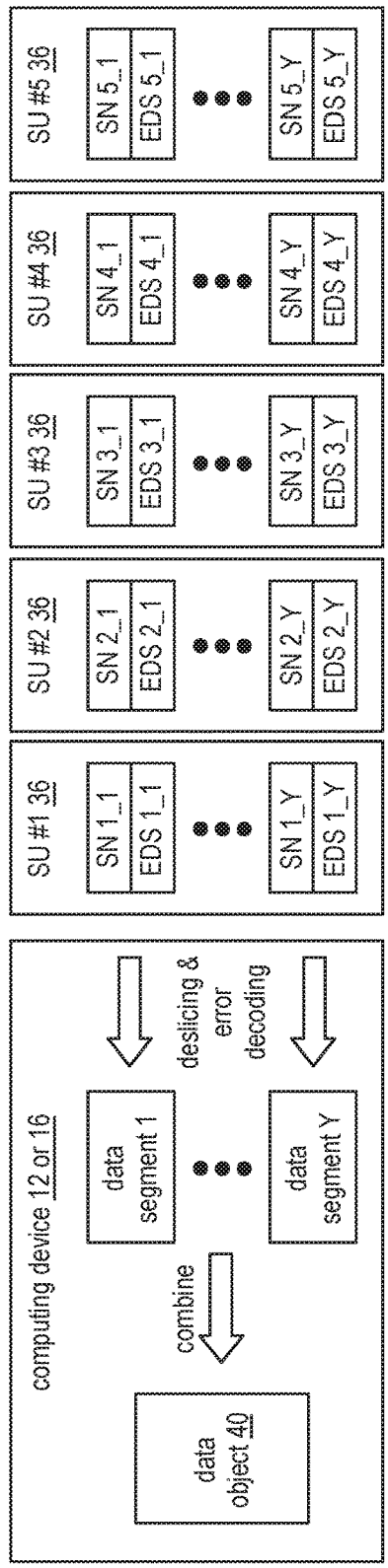
FIG. 8 is a schematic block diagram of an example of dispersed storage error decoding of data in accordance with the present invention.

FIG. 8 is a schematic block diagram of an example of dispersed storage error decoding of a data object that was dispersed storage error encoded and stored in the example of FIG. 5. In this example, the computing device (e.g., user device 12 or DST processing unit 16) retrieves from the storage units (e.g., a set of DST execution units) at least the decode threshold number of encoded data slices per data segment. As a specific example, the computing device retrieves a read threshold number of encoded data slices.

Figure 9:
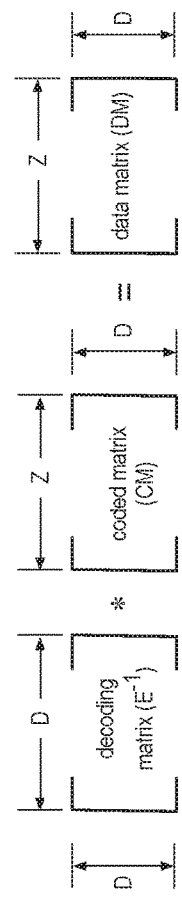
FIG. 9 is a schematic block diagram of a generic example of an error decoding function in accordance with the present invention.

To recover a data segment from a decode threshold number of encoded data slices, the computing device uses a decoding function as shown in FIG. 9. As shown, the decoding function is essentially an inverse of the encoding function of FIG. 5. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 10:
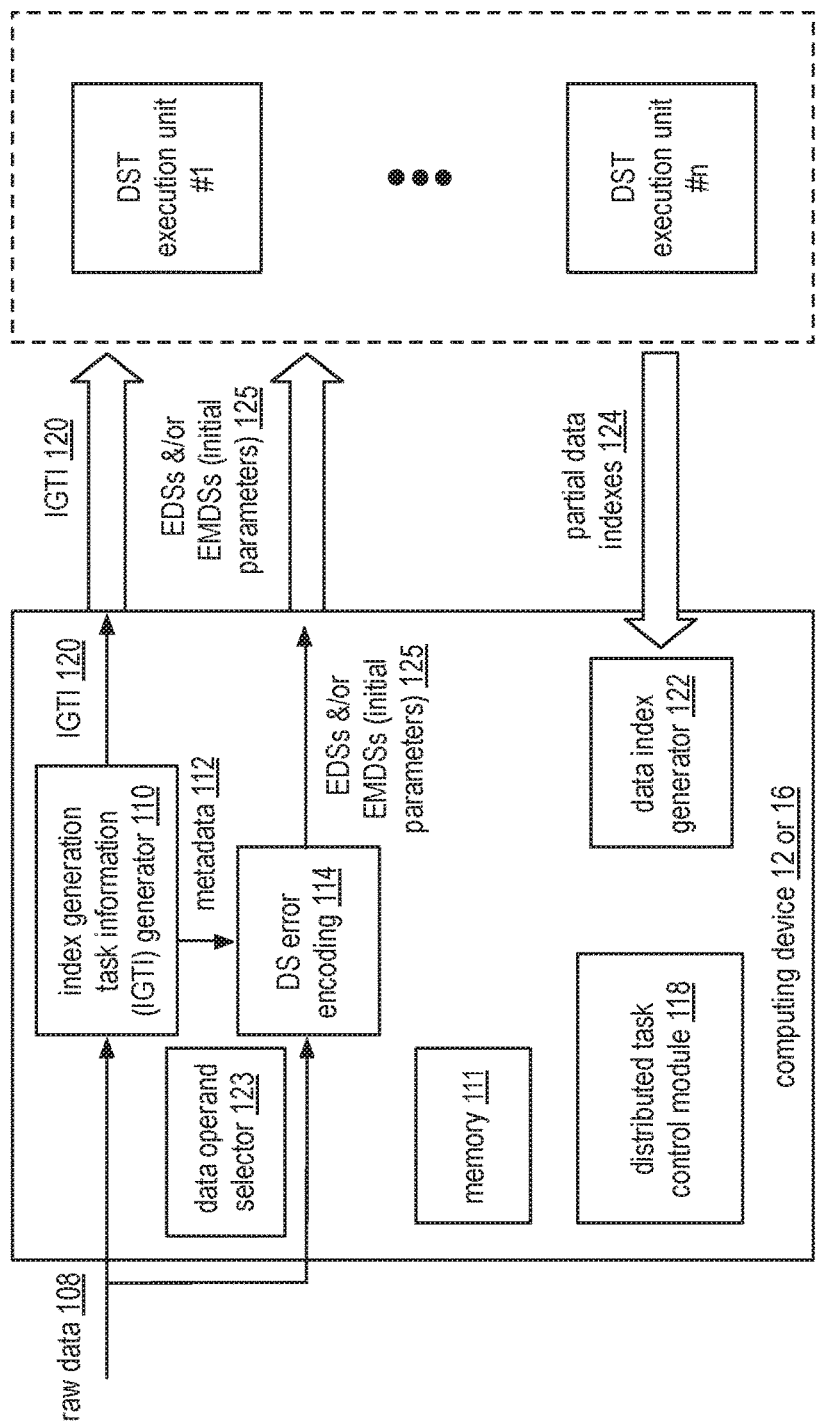
FIG. 10 is a schematic block diagram of an embodiment of an example of the distributed computing system performing raw data processing in accordance with the present invention.

FIG. 10 is a schematic block diagram of an example of the distributed computing system performing raw data processing. The distributed computing system includes computing device 12 or 16 (e.g., user device 12 or DST processing unit 16) and a set of DST execution unit #1-n. The computing device 12 or 16 includes an index generation task information (IGTI) generator 110, memory 111, a DS error encoding module 114, a distributed task control module 118, a data index generator 122, and a data operand selector 123. In an example of operation, the computing device 12 or 16 receives raw data 108 for storage within the distributed storage and task network (DSTN). For example, the computing device 12 or 16 receives a web upload as the raw data 108. As another example, the processing module receives a mass storage upload as the raw data 108.

The DS error encoding module 114 dispersed storage error encodes the raw data in accordance with initial dispersed storage error encoding parameters to produce a plurality of sets of encoded data slices (EDSs). The DS error encoding parameters (e.g. or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.). For example, the initial dispersed storage error encoding parameters may initially be set for low reliability and high throughput. The DS error encoding module 114 may also dispersed storage error encode metadata regarding the raw data to create a plurality of sets of encoded metadata slices (EMDSs) in accordance with initial dispersed storage error encoding parameters.

The index generation task information (IGTI) generator 110 determines index task generation information 120 regarding the raw data 108. The index generation task information 120 may be generated based on a storage profile regarding the raw data 108 and may include a search parameter, a keyword, pattern recognition information, and timing information. The storage profile includes one or more of a security requirement, a performance requirement, an estimated retrieval frequency, an estimated distributed processing level, a data visibility profile, a data owner, a data index storage indicator, and a data deletion policy. The data deletion policy includes a data deletion indicator specifying circumstances to delete the raw data from the DSTN. For example, the data deletion indicator includes at least one of delete after a deletion time period expires, a deletion time period, never delete, and delete only upon request.

The computing device 12 or 16 sends the plurality of sets of encoded data slices (and/or the EMDSs) 125 and the index generation task information 120 to the set of DST execution units. The set of DST execution units generates partial data indexes 124 from the plurality of sets of encoded data slices (and/or the EMDSs) 125 based on the index generation task information 120. The data index generator 122 receives the partial data indexes 124. Creating a data index from the partial data indexes 124 will be discussed with reference to FIG. 11.

Figure 11:
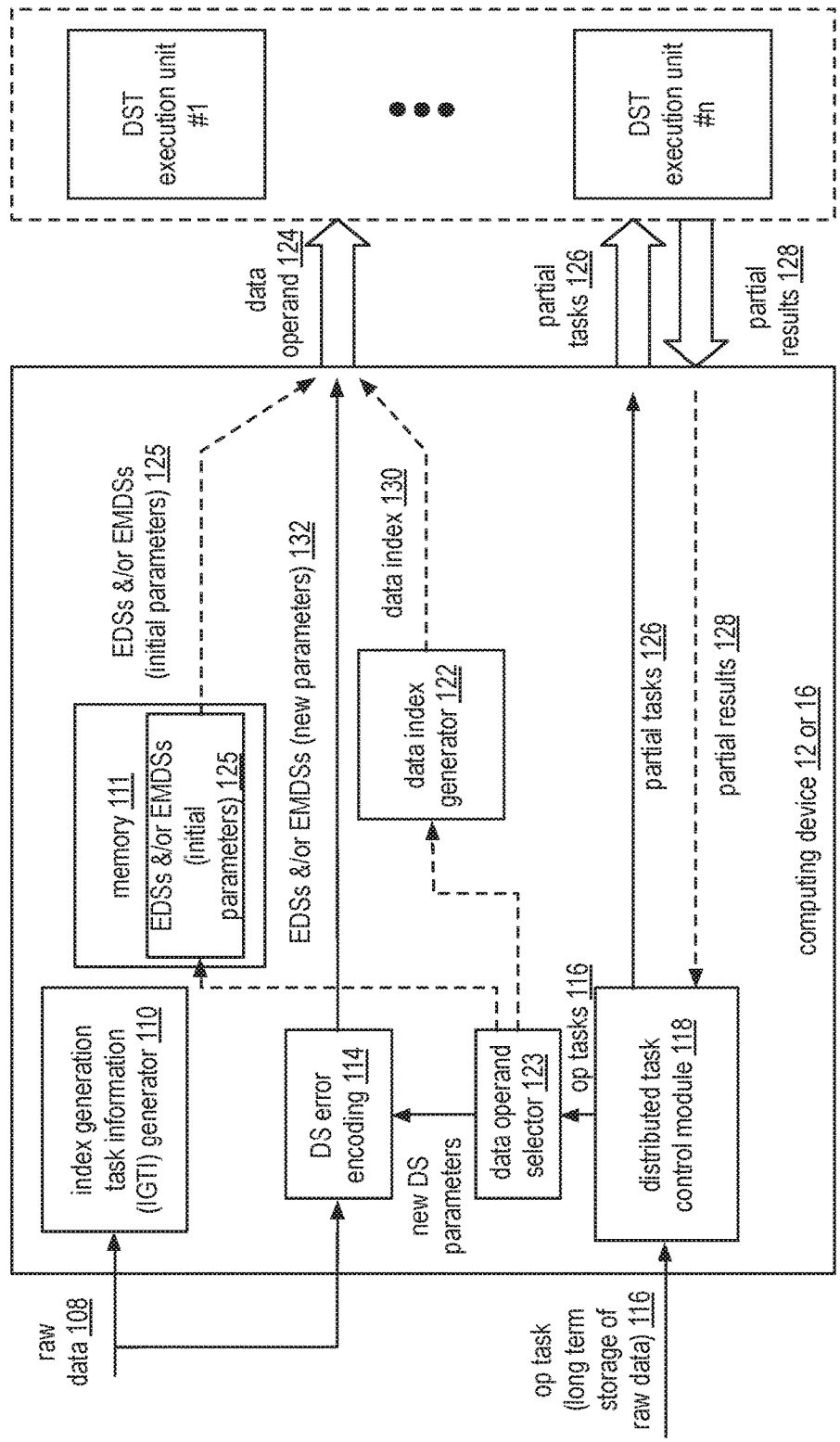
FIG. 11 is a schematic block diagram of an embodiment of another example of the distributed computing system performing raw data processing in accordance with the present invention.

FIG. 11 is a schematic block diagram of another example of the distributed computing system performing raw data processing. The distributed computing system includes computing device 12 or 16 (e.g., user device 12 or DST processing unit 16) and a set of DST execution unit #1-n. The computing device 12 or 16 includes the index generation task information (IGTI) generator 110, memory 111, DS error encoding module 114, distributed task control module 118, data index generator 122, and data operand selector 123 of FIG. 10. In an example of operation, after the computing device 12 or 16 receives the partial data indexes 124 (as discussed previously with reference to FIG. 10), the data index generator 122 creates a data index 130 based on the partial data indexes 124. The data index 130 may include one or more of identified keywords, identified dates, identified internet protocol addresses, partial content, a word count, raw data statistics, a summary of the raw data, and one or more DST network addresses.

The computing device 12 or 16 then determines an operational task 116 (e.g., an operational task or tasks received with the raw data) from a list of operational tasks. The list of operational tasks includes storing the plurality of sets of encoded data slices (and/or EMDSs), storing the data index, long term storage of the raw data, execute a data processing function on the sets of encoded data slices (and/or EMDSs), and execute a data processing function on the data index. The distributed task control module 118 partitions the operational task 116 into a set of partial tasks 126 and sends the set of partial tasks 126 to the set of DST execution units. The data operand selector 123 then determines a data operand 124 to send to the set of DST execution units corresponding to the operational task. The data operand 124 may include one or more of the plurality of sets of error encoded slices (and/or EMDSs) DS error encoded with the initial parameters 125, a plurality of sets of error encoded slices (and/or EMDSs) DS error encoded with the new parameters 132, and the data index 130.

For example, and as illustrated in FIG. 11, if the operational task is long term storage of the raw data 108, the data operand selector 123 of the computing device 12 or 16 determines that new dispersed error encoded data slices with new dispersed storage error encoding parameters are the data operand. The data operand selector 123 will notify the DS error encoding module 114 that new dispersed storage error encoding parameters are required based on the operational task 116. For example, the DS error encoding 114 may select dispersed storage error encoding parameters corresponding to high reliability when the operational task 116 is long term storage of raw data. The DS error encoding module 114 dispersed storage error encodes the raw data 108 in accordance with the new dispersed storage error encoding parameters to produce a new plurality of sets of encoded data slices (e.g., the plurality of sets of error encoded slices (and/or EMDSs) DS error encoded with new parameters 132). The computing device 12 or 16 then sends the new plurality of encoded data slices (and/or EMDSs) 132 and the set of partial tasks 126 to the set of DST execution units, such that the set of DST execution units stores the new plurality of encoded data slices. Alternatively, if the operational task is to execute a data processing function on the data index 130, the computing device will send the data index 130 along with the partial tasks 126 to the set of DST execution units. Further, if the operational task is to execute a data processing function on the sets of encoded data slices (and/or EMDSs) DS error encoded with the initial parameters 125, the computing device will send the plurality of sets of encoded data slices (and/or EMDSs) DS error encoded with the initial parameters 125 (stored in memory 111) along with the partial tasks 126 to the set of DST execution units.

At least some of the set of DST execution units may then execute the set of partial tasks 126 on at least some of the plurality of sets of encoded data slices (e.g. or other data operand 124). For example, when the operational task 116 is long term storage of raw data, at least some of the DST execution units of the set of DST execution units store the plurality of sets of encoded data slices with new parameters 132. When the operational tasks 116 require a result (e.g., the operational task 116 includes data mining), at least some of the set of DST execution units may execute the set of partial tasks 126 on the data operand and return partial results 128. The distributed task control module 118 is operable to assemble the partial results 128 into a result.

Figure 12:
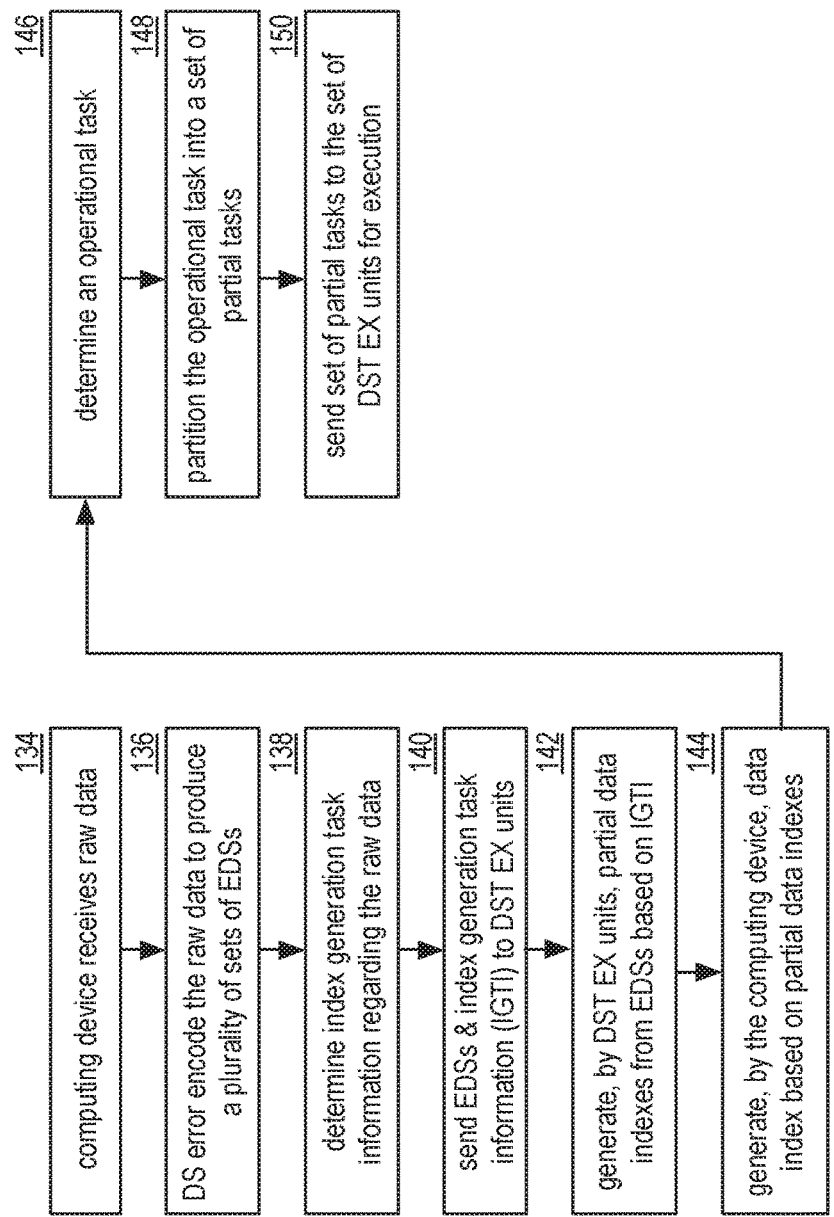
FIG. 12 is a logic diagram illustrating another example of the distributed computing system performing raw data processing in accordance with the present invention.

FIG. 12 is a logic diagram illustrating another example of the distributed computing system performing raw data processing. The method begins with step 134 where a computing device of a distributed storage and task (DST) network (DSTN) receives raw data. For example, the computing device receives a web upload as the raw data. As another example, the processing module receives a mass storage upload as the raw data. The method continues with step 136 where the computing device dispersed storage error encodes the raw data in accordance with initial dispersed storage error encoding parameters to produce a plurality of sets of encoded data slices (EDSs).

The DS error encoding parameters (e.g. or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.). For example, the initial dispersed storage error encoding parameters may be set for low reliability and high throughput. The computing device may also dispersed storage error encode metadata regarding the raw data to create a plurality of sets of encoded metadata slices (EMDSs) in accordance with initial dispersed storage error encoding parameters.

The method continues with step 138 where the computing device determines index task generation information regarding the raw data. The index generation task information may be generated based on a storage profile regarding the raw data and may include a search parameter, a keyword, pattern recognition information, and timing information. The storage profile includes one or more of a security requirement, a performance requirement, an estimated retrieval frequency, an estimated distributed processing level, a data visibility profile, a data owner, a data index storage indicator, and a data deletion policy. The data deletion policy includes a data deletion indicator specifying circumstances to delete the raw data from the DSTN. For example, the data deletion indicator includes at least one of delete after a deletion time period expires, a deletion time period, never delete, and delete only upon request.

The method continues with step 140 where the computing device sends the plurality of sets of encoded data slices (and/or the EMDSs) and the index generation task information to a set of DST execution units. The method continues with step 142 where the set of DST execution units generates partial data indexes from the plurality of sets of encoded data slices (and/or the EMDSs) based on the index generation task information.

The method continues with step 144 where the computing device generates a data index based on the partial data indexes. The data index may include one or more of identified keywords, identified dates, identified internet protocol addresses, partial content, a word count, raw data statistics, a summary of the raw data, and one or more DST network addresses. The method continues with step 146 where the computing device determines an operational task from a list of operational tasks. The list of operational tasks includes storing the plurality of sets of encoded data slices (and/or EMDSs), storing the data index, long term storage of the raw data, execute a data processing function on the sets of encoded data slices (and/or EMDSs), and execute a data processing function on the data index.

The method continues with step 148 where the computing device partitions the operational task into a set of partial tasks. The method continues with step 150 where the computing device sends the set of partial tasks to the set of DST execution units. In addition to sending the set of partial tasks, the computing device sends the data operand corresponding to the operational task to the set of DST execution units. The data operand may include one or more of the plurality of sets of error encoded slices (and/or EMDSs) DS error encoded with the initial parameters, a plurality of sets of error encoded slices (and/or EMDSs) DS error encoded with the new parameters, and the data index. At least some of the set of DST execution units may then execute the set of partial tasks on at least some of the plurality of sets of encoded data slices (e.g. or other data operand). When the operational tasks require a result (e.g., the operational task includes data mining), at least some of the set of DST execution units may execute the set of partial tasks on the data operand and return partial results. The computing device is operable to assemble the partial results into a result.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    receiving, by a computing device of a distributed storage and task (DST) network, raw data;
    dispersed storage error encoding, by the computing device, the raw data in accordance with initial dispersed storage error encoding parameters to produce a plurality of sets of encoded data slices, wherein the initial dispersed storage error encoding parameters include one or more of: initial data segmenting information, initial segment security information, initial error coding information, initial slicing information, and initial slice security information;
    determining, by the computing device, index generation task information regarding the raw data;
    sending, by the computing device, the plurality of sets of encoded data slices and the index generation task information to a set of DST execution units;
    generating, by the set of DST execution units, partial data indexes from the plurality of sets of encoded data slices based on the index generation task information;
    generating, by the computing device, a data index based on the partial data indexes;
    determining, by the computing device, an operational task from a list of operational tasks that includes storing the plurality of sets of encoded data slices, storing the data index, long term storage of the raw data, execute a data processing function on the sets of encoded data slices and execute a data processing function on the data index;
    partitioning, by the computing device, the operational task into a set of partial tasks; and
    sending, by the computing device, the set of partial tasks to the set of DST execution units.

2. The method of claim 1 further comprises:
    executing, by at least some of the set of DST execution units, the set of partial tasks on at least some of the plurality of sets of encoded data slices.

3. The method of claim 1, wherein the determining the index generation task information comprises:
    determining, by the computing device, the index generation task information based on a storage profile regarding the raw data.

4. The method of claim 3, wherein the index generation task information includes one or more of:
    a search parameter;
    a keyword;
    pattern recognition information; and
    timing information.

5. The method of claim 3, wherein the storage profile includes one or more of:
    a security requirement;
    a performance requirement;
    an estimated retrieval frequency;
    an estimated distributed processing level;
    a data visibility profile;
    a data owner;
    a data index storage indicator; and
    a data deletion policy.

6. The method of claim 1, wherein the data index includes one or more of:
    identified keywords;
    identified dates;
    identified internet protocol addresses;
    partial content;
    a word count;
    raw data statistics;
    a summary of the raw data; and
    one or more DST network addresses.

7. The method of claim 1 further comprises:
    when the operational task is long term storage of the raw data, selecting, by the computing device, new dispersed storage error encoding parameters;
    dispersed storage error encoding, by the computing device, the raw data in accordance with the new dispersed storage error encoding parameters to produce a new plurality of sets of encoded data slices; and
    sending, by the computing device, the new plurality of encoded data slices and the set of partial tasks to the set of DST execution units, such that the set of DST execution units stores the new plurality of encoded data slices.

8. A computer readable memory comprises:
a first memory element that stores operational instructions that, when executed by a computing device of a distributed storage and task (DST) network, causes the computing device to:
  receive raw data;
  dispersed storage error encode the raw data in accordance with initial dispersed storage error encoding parameters to produce a plurality of sets of encoded data slices, wherein the initial dispersed storage error encoding parameters include one or more of: initial data segmenting information, initial segment security information, initial error coding information, initial slicing information, and initial slice security information;
  determine index generation task information regarding the raw data; and
  send the plurality of sets of encoded data slices and the index generation task information to a set of DST execution units;
a second memory element that stores operational instructions that, when executed by the set of DST execution units, causes the set of DST execution units to:
  generate partial data indexes from the plurality of sets of encoded data slices based on the index generation task information;
a third memory element that stores operational instructions that, when executed by the computing device, causes the computing device to:
  generate a data index based on the partial data indexes;
  determine an operational task from a list of operational tasks that includes storing the plurality of sets of encoded data slices, storing the data index, long term storage of the raw data, execute a data processing function on the sets of encoded data slices and execute a data processing function on the data index;
  partition the operational task into a set of partial tasks; and
  send the set of partial tasks to the set of DST execution units.

9. The computer readable memory of claim 8 further comprises:
a fourth memory element that stores operational instructions that, when executed by the set of DST execution units, causes at least some of the set of DST execution units to:
  execute the set of partial tasks on at least some of the plurality of sets of encoded data slices.

10. The computer readable memory of claim 8, wherein the first memory element further stores operational instructions that, when executed by the computing device, causes the computing device to determine the index generation task information by:
  determining the index generation task information based on a storage profile regarding the raw data.

11. The computer readable memory of claim 10, wherein the index generation task information includes one or more of:
  a search parameter;
  a keyword;
  pattern recognition information; and
  timing information.

12. The computer readable memory of claim 10, wherein the storage profile includes one or more of:
  a security requirement;
  a performance requirement;
  an estimated retrieval frequency;
  an estimated distributed processing level;
  a data visibility profile;
  a data owner;
  a data index storage indicator; and
  a data deletion policy.

13. The computer readable memory of claim 8, wherein the data index includes one or more of:
  identified keywords;
  identified dates;
  identified internet protocol addresses;
  partial content;
  a word count;
  raw data statistics;
  a summary of the raw data; and
  one or more DST network addresses.

14. The computer readable memory of claim 8, wherein the third memory element further stores operational instructions that, when executed by the computing device, causes the computing device to:
  when the operational task is long term storage of the raw data select new dispersed storage error encoding parameters;
  dispersed storage error encodes the raw data in accordance with the new dispersed storage error encoding parameters to produce a new plurality of sets of encoded data slices; and
  send the new plurality of encoded data slices and the set of partial tasks to the set of DST execution units, such that the set of DST execution units stores the new plurality of encoded data slices.

* * * * *